US011131363B2

(12) United States Patent
Smith et al.

(10) Patent No.: US 11,131,363 B2
(45) Date of Patent: Sep. 28, 2021

(54) VIBRATION ATTENUATING FLUID MOUNT WITH PARTITIONED COMPENSATOR

(71) Applicant: Textron Innovations Inc., Providence, RI (US)

(72) Inventors: Michael Reaugh Smith, Colleyville, TX (US); Frank Bradley Stamps, Colleyville, TX (US); Craig Turner, Lewisville, TX (US); Maurice Griffin, Euless, TX (US)

(73) Assignee: Textron Innovations Inc., Providence, RI (US)

(*) Notice: Subject to any disclaimer, the term of this patent is extended or adjusted under 35 U.S.C. 154(b) by 0 days.

(21) Appl. No.: 15/785,114

(22) Filed: Oct. 16, 2017

(65) Prior Publication Data

US 2019/0113098 A1 Apr. 18, 2019

(51) Int. Cl.
| | |
|---|---|
| *F16F 13/10* | (2006.01) |
| *F16F 9/06* | (2006.01) |
| *F16F 13/24* | (2006.01) |
| *F16F 13/18* | (2006.01) |
| *F16F 13/14* | (2006.01) |

(52) U.S. Cl.
CPC ............ *F16F 13/107* (2013.01); *F16F 9/066* (2013.01); *F16F 13/1481* (2013.01); *F16F 13/18* (2013.01); *F16F 13/24* (2013.01); *F16F 2222/126* (2013.01)

(58) Field of Classification Search
CPC .......... F16F 13/107; F16F 9/066; F16F 13/18; F16F 13/24; F16F 222/126; F16F 2222/126; F16F 13/1481

USPC ............ 188/269, 378, 352; 267/136, 140.11
See application file for complete search history.

(56) References Cited

U.S. PATENT DOCUMENTS

| | | | | |
|---|---|---|---|---|
| 4,236,607 A | * | 12/1980 | Halwes | B64C 27/001 188/379 |
| 4,811,919 A | * | 3/1989 | Jones | B64D 27/18 244/54 |
| 5,127,607 A | | 7/1992 | McGuire | |
| 5,197,692 A | | 3/1993 | Jones et al. | |
| 5,374,039 A | | 12/1994 | Schmidt et al. | |
| 5,413,320 A | | 5/1995 | Herbst | |
| 5,501,434 A | | 3/1996 | McGuire | |
| 5,540,549 A | | 7/1996 | McGuire | |
| 5,788,372 A | * | 8/1998 | Jones | B64D 27/26 137/513.3 |
| 5,915,842 A | | 6/1999 | Redinger | |

(Continued)

OTHER PUBLICATIONS

Flower, Wallace C., "Understanding Hydraulic Mounts for Improved Vehicle Noise, Vibration and Ride Qualities," SAE Technical Paper 850975, Surface Vehicle Noise and Vibration Conference, Traverse City, MI, May 15-17, 1985.

*Primary Examiner* — Melody M Burch
(74) *Attorney, Agent, or Firm* — Whitaker Chalk Swindle & Schw; Enrique Sanchez, Jr.

(57) ABSTRACT

A vibration attenuating fluid mount with a partitioned compensator includes an inner member, an outer member, a flexible member having a castellated transition between a fluid passageway and at least one operating chamber. A membrane may be disposed in a volume compensator in fluid communication with one or more operating chambers. The inner member and outer member may be connected via a castellated connection, a swaged lock ring, or a split-lock ring.

17 Claims, 6 Drawing Sheets

(56) References Cited

U.S. PATENT DOCUMENTS

| | | | | |
|---|---|---|---|---|
| 6,032,936 | A * | 3/2000 | Redinger | F16F 1/38 |
| | | | | 188/352 |
| 6,431,530 | B1 * | 8/2002 | Stamps | F16F 1/38 |
| | | | | 267/136 |
| 8,499,907 | B2 * | 8/2013 | Smith | B64C 27/001 |
| | | | | 188/378 |
| 8,888,079 | B2 * | 11/2014 | Smith | F16F 13/08 |
| | | | | 188/314 |
| 9,249,856 | B1 * | 2/2016 | Lee | F16F 13/24 |
| 9,446,841 | B2 * | 9/2016 | Smith | B64C 27/001 |
| 9,765,641 | B2 * | 9/2017 | Smith | F16F 13/08 |
| 2015/0321807 | A1 * | 11/2015 | Cotton | A47G 19/12 |
| | | | | 220/227 |
| 2016/0053844 | A1 * | 2/2016 | Nagasawa | F16F 13/106 |
| | | | | 267/140.13 |

\* cited by examiner

VIBRATION ATTENUATING FLUID MOUNT WITH PARTITIONED COMPENSATOR

BACKGROUND OF THE INVENTION

1. Field of the Invention

This invention relates to devices used to mitigate vibration in a dynamic environment. Embodiments in accordance with the present invention are intended for use with structural bodies mounted to locomotive assemblies, such as rotors, propellers, and/or engines.

2. Background of the Invention and Description of Related Art

Mountings for engine vibration reduction typically include fluid that serves as an active mass based upon inputs in the form of vibration or movement from a motion source. These vibration-attenuating units are commonly known as "LIVE" (Liquid Inertia Vibration Eliminator) isolators in the aviation industry. In the instant invention, the motion source may be a vibration source created by a propeller or rotor in an aviation vehicle. The vibrations caused by the constant or near constant frequency and forceful rotation of rotor and/or propeller air foils generates significant and repeated harmonic loading on an engine housing, chassis, passenger cabin, or other connected structure.

Several sources of fluid mounts have been employed and introduced in the past. Examples include LIVE units described by Lord Technical Article LL-2166 entitled "Understanding Hydraulic Mounts for Improved Vehicle Noise, Vibration and Ride Qualities" by W. C. Flower, and U.S. Pat. Nos. 4,811,919, 5,413,320, 5,374,039, 5,127,607, 5,197,692, 5,540,549, 5,501,434, 5,915,842, and 6,032,936.

As stated aptly in U.S. Pat. No. 6,032,936, "Fluid mounts are, in essence, tunable passive devices which use a fluid as tuned-fluid 'inertia' effects." The issue with existing methods of tuned-fluid inertial devices is the existence and/or formation of gas bubbles in the fluid during expansion, contraction, and when vibratory motion is applied to the fluid. The presence of gas bubbles in the fluid limits and otherwise affects the ability of the fluid in one chamber from moving to another chamber based on changes of viscosity and fluidity including the relative density of the fluid when gas bubbles are formed and slowly re-dissolved in the fluid.

Accordingly, a better design to reduce cavitation in the fluid is required, which requires more reliable methods of maintaining pressure in the fluid, re-assimilation/absorption of gas into the fluid isolator, and compensation for variations.

SUMMARY OF THE INVENTION

Accordingly, one aspect of the present invention comprises a multi-chamber fluid mount adapted to be mounted between the vibratory motion source and a static structure. In one embodiment, the multi-chamber fluid mount comprises a diaphragm-like separation between a gas chamber and a fluid chamber.

In another aspect of the invention, the vibration isolator assembly includes an inner member and an outer member, with the two members being separated by a flexible member comprising a rigid member and an elastomeric coating. In an embodiment of the invention, the end of the flexible member separating the inner member and outer member comprises a castellated portion. The castellated terminal end of the flexible member improves the ability of the vibration isolation unit to dissolve gasses trapped in the fluid portion of the assembly back into the fluid without degrading the oscillating pressure differential between the gas chamber and fluid chamber, and thus retaining the fluid properties of the moving fluid in the chamber.

In yet another embodiment, the inner member and outer member are held together through the use of the castellated design of the flexible member. In other words, the inner- and outer-members themselves are held together through the use of a castellated locking feature, swaged retaining ring, or split ring. This change improves upon the "axial threaded portion" as shown in prior art systems, such as U.S. Pat. Nos. 6,032,936 and 5,915,842, because the castellated portion of the mating surfaces have a dual purpose. First, they replace the sloping surface of the flexible member with a castellated structure, which can retard the rise of gas bubbles created through the oscillating pressure in the fluid chamber resulting in increased cumulative surface area with dispersed numerous smaller bubbles in lieu of fewer larger bubbles, enhancing their re-dissolution into the fluid. Second, they serve as matched mating surfaces for the elastomeric layers interspersed with shims to connect the inner and outer members of the LIVE unit. This second purpose reduces the free-end peel strains in the elastomeric layers.

In yet another embodiment, a sloping surface is added to the external surface of the LIVE unit to reduce the likelihood of water being trapped in external surfaces of the unit during operation.

Other advantages will be apparent to those of ordinary skill in the art.

DETAILED DESCRIPTION OF THE INVENTION

The invention will now be described in greater detail, with like elements denoted by like numerals as referenced in the attached figures.

Figure 1:
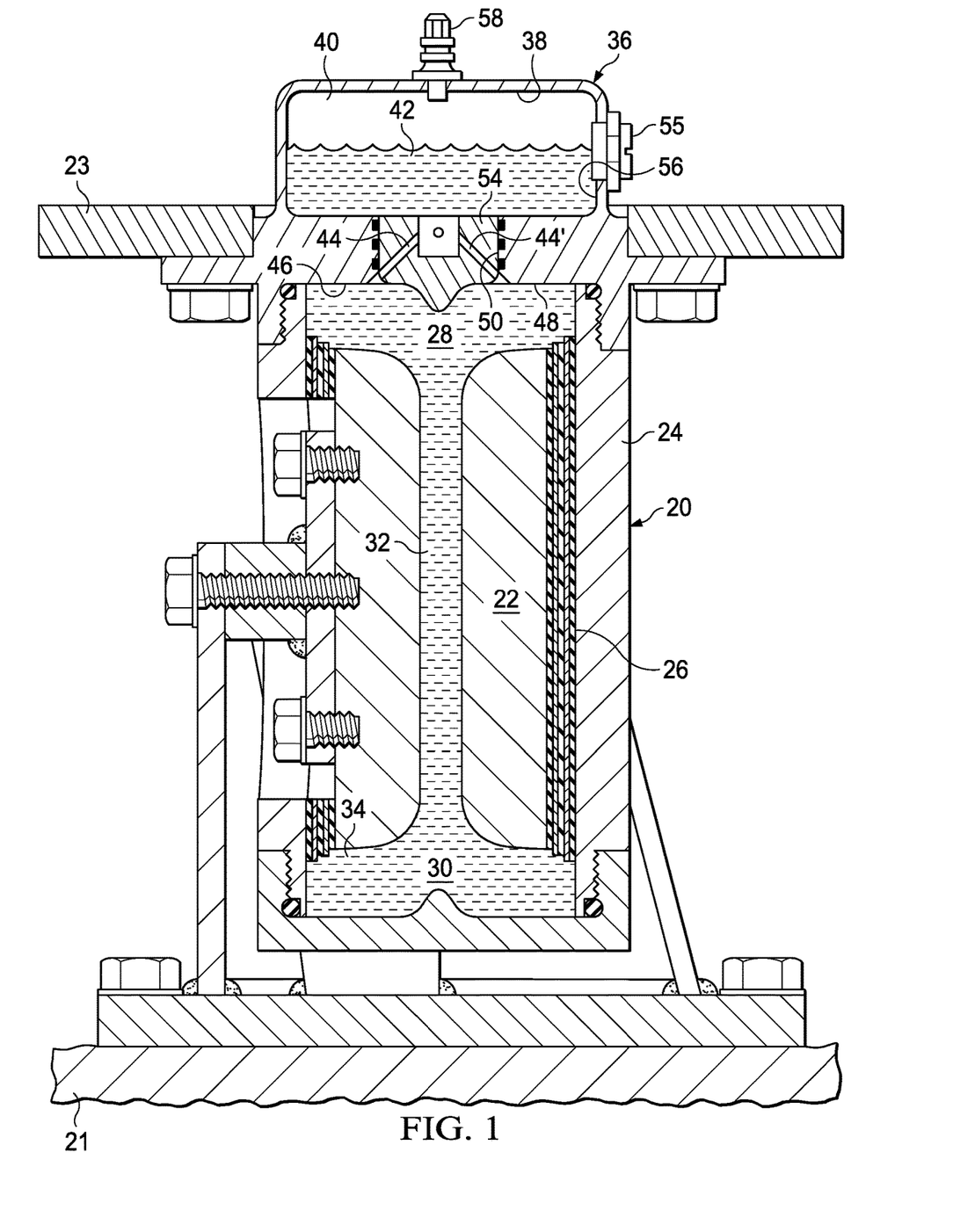
FIG. 1 and FIG. 2 are embodiments of the LIVE unit in accordance with the present invention.
Figure 1A:
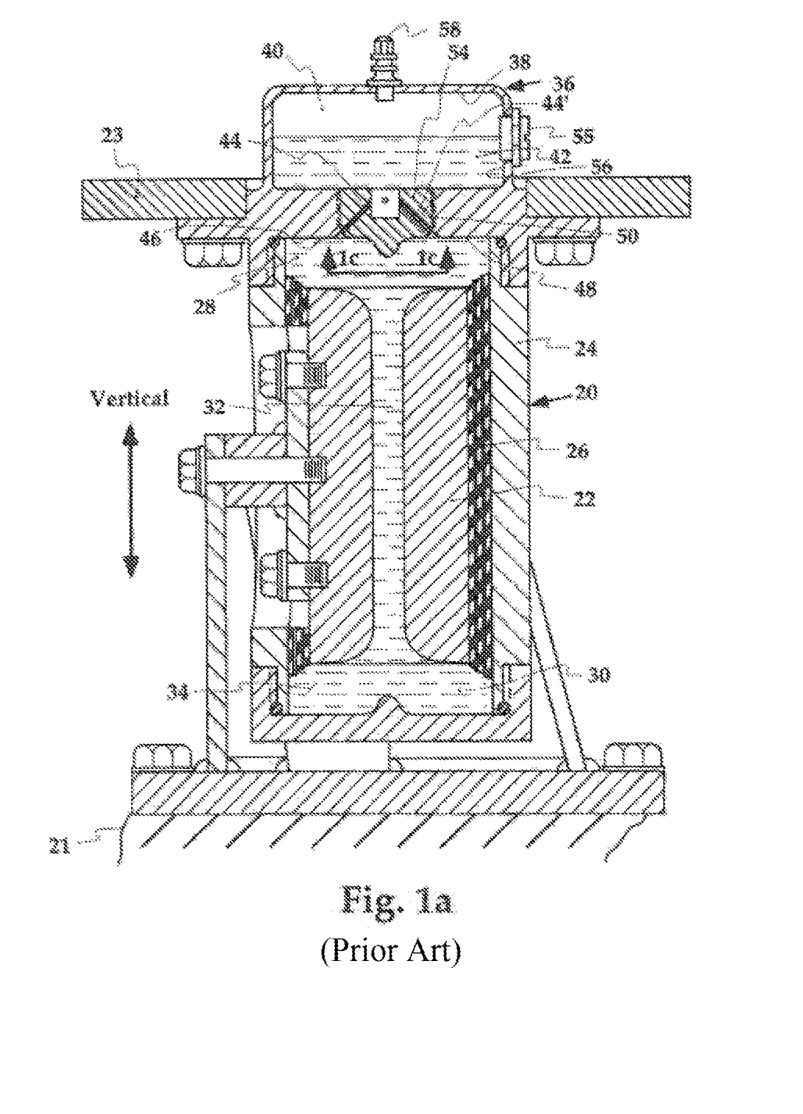
FIG. 1a is a representation of the prior art design of a LIVE unit.

FIG. 1a is an example of a fluid-tuned passive attenuating device, or LIVE unit, in accordance with the prior art. The present invention represents a substantial improvement over the device shown in FIG. 1a, which is described in more detail in U.S. Pat. No. 6,032,936 to Redinger. As this invention represents an improvement over the existing art as described in Redinger, like numbers will be used to describe the prior art herein. A fluid mount 20 includes a partitionless compensator 36. Fluid mount or "LIVE unit" 20 is disposed between a vibrating member 21, such as a helicopter transmission or aircraft engine, and a structure 23, such as an aircraft body, or fuselage, or other rigid structure. It will be understood that the "LIVE unit" 20 functions the same when the attachments are exchanged such that the vibrating member is 23 and the structure is 21. LIVE unit 20 includes an inner rigid member 22 adapted to be connected to a vibrating member 21, and an outer member 24 adapted to be connected to a rigid structure 23, such as a helicopter fuselage. A flexible elastomer layer 26 is disposed between inner member 22 and outer member 24. The flexible elastomer layer 26 may be homogeneous elastomers such as rubber, synthetic rubber, or other flexible synthetic or natural materials, and may alternatively be laminated with interspersed shims 27 in accordance with the prior art. Flexible elastomer layer 26 is generally sloped between the outer member 24 inward toward the inner layer 22, as shown in FIG. 1a where the flexible elastomer layer 26 is in contact with fluid 34 at first operating chamber 28 and second operating chamber 30. The two operating chambers 28 and 30 are interconnected via fluid passage 32 which is formed of a specific size (such as, cross-sectional area) and length so as to be tunable based on the density of fluid 34 used in the LIVE unit 20.

The prior art also discloses a partitionless volume compensator 36 attached to a portion of the outer member 24 which includes a chamber 38 with a gas-filled portion 40 and a fluid-filled portion 42, which is "devoid of any barrier separating the portions 40 and 42."

Figure 2:
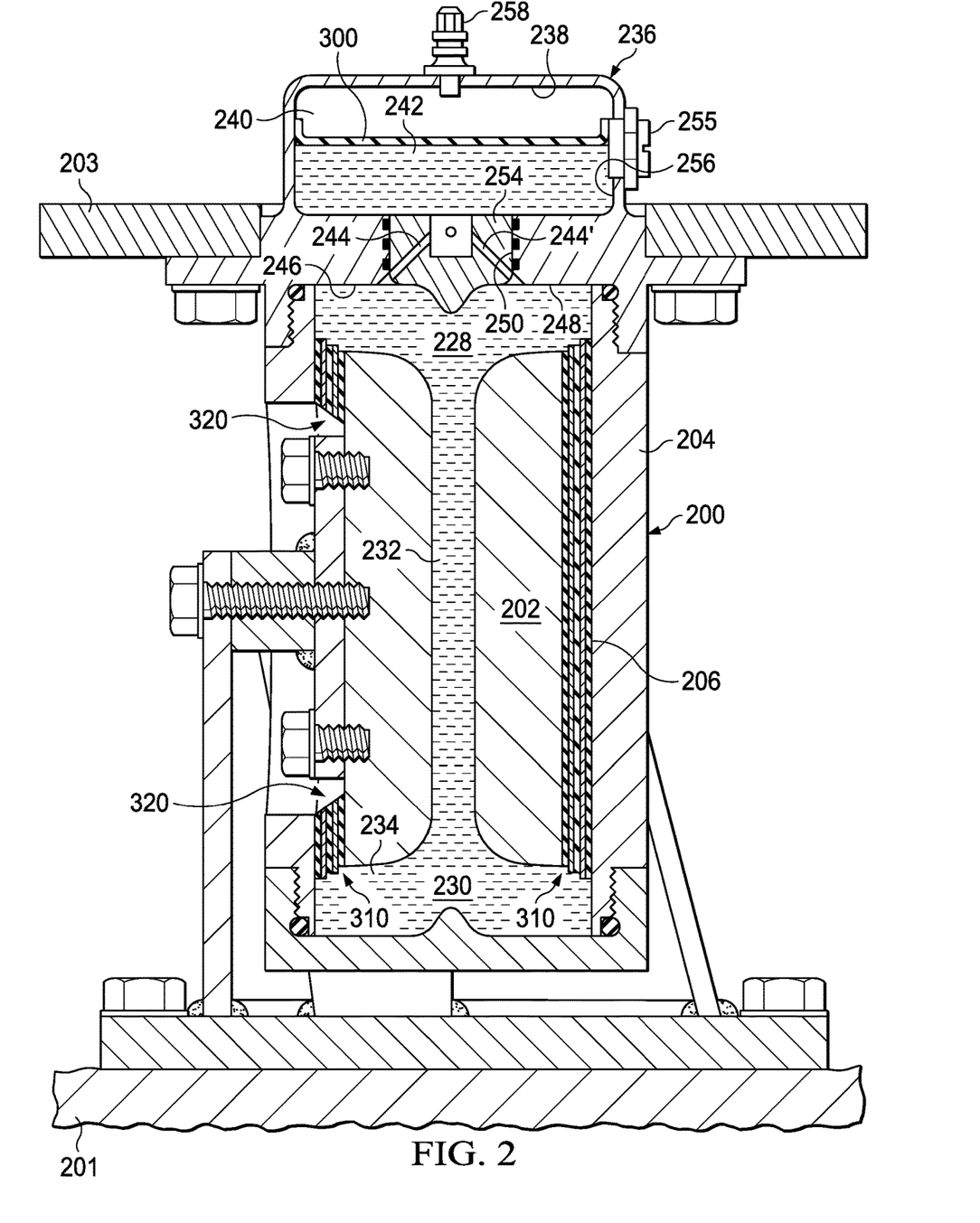

The present invention improves upon the design of Redinger as shown in FIG. 1a. FIGS. 1 and 2 generally shows the LIVE unit 200 as described by Redinger and modified by the improvements described herein. The LIVE unit 200 includes an inner rigid member 202 and a rigid outer member 204 that are connected via a flexible member 206, having a castellated terminal end shown in FIG. 2A at 310. The flexible member 206 may include a flexible barrier material 312 in FIG. 2A for protection of the flexible layer 206 disposed between the inner member 202 and outer member 204 or as extensions of the same flexible layer 206. The flexible barrier material 312 can be an elastomer or other suitable material. The flexible member 206 may also include one or more rigid shims 322. In accordance with the present invention, the castellated terminal end (castellations or stepped portions) 310 may be included to mitigate rapid mass-migration of gas bubbles 314 to the top of the LIVE unit 200. Additionally, the stepped portions can reduce the volume of at least one of the first or second operating chamber from the operating chamber to the fluid passageway. By incorporating the castellations 310 into the design, the bubbles are trapped at various locations within the fluid chamber 230 to mitigate rapid ascension through the tuned passage 232 to upper chamber 228. This is advantageous over the sloped design of Redinger because rather than forcing an unbalanced situation to the lock mechanism shown at 44 of FIG. 1 (244 of FIG. 2), the castellations 310 of the present invention allow for dissolution of gas bubbles 314 created through hydraulically amplified oscillating pressure from the vibration action back into fluid 234. This aspect is important because when the gas bubbles 314 are directed through the lock chamber 244 and bubble trap 246, they eventually migrate into the gas-filled portion 40 of FIG. 1 (240 of FIG. 2), thus increasing the volume of the gas-filled portion relative to the fluid-filled portion 42 of FIG. 1 (242 of FIG. 2), which is undesirable.

Figure 2A:
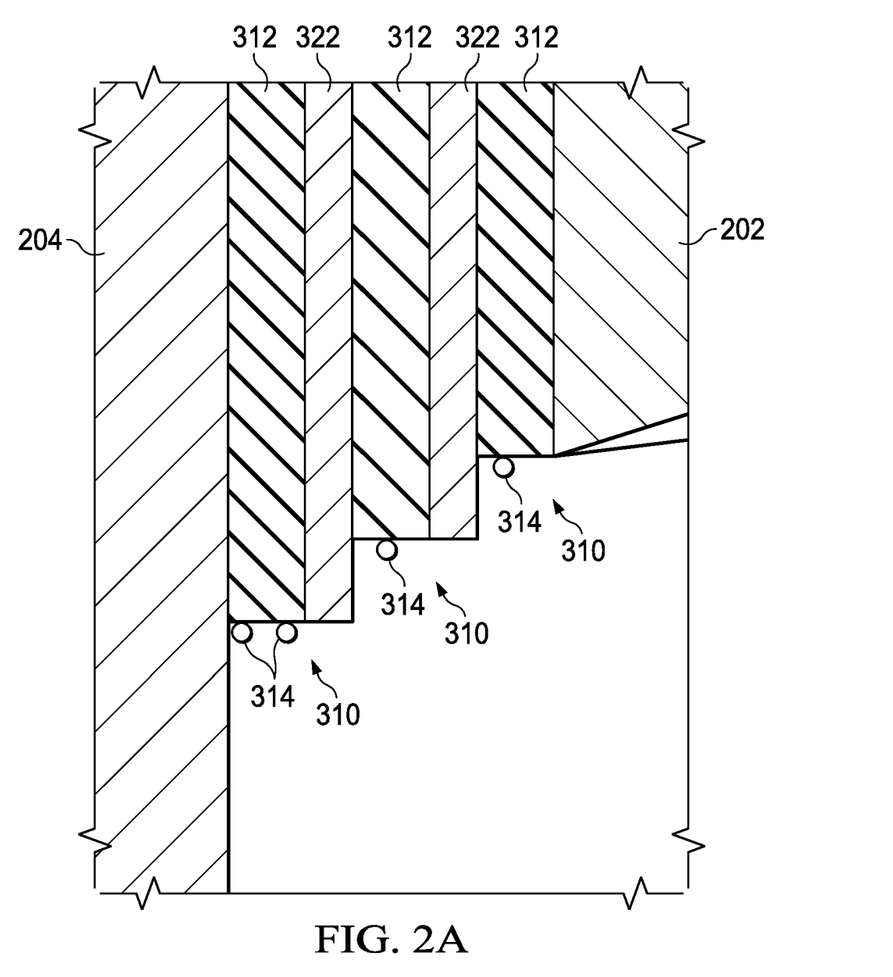
FIG. 2A is an enlarged view of the castellated portion of the flexible connecting member disposed between the inner and outer members of a LIVE unit in accordance with an embodiment of the present invention.

Referring to FIG. 2A, gas bubbles 314 are held in the castellations 310 of the junction between inner member 202 and outer member 204, thereby improving the rapidity of gas re-absorption into the fluid 234 by increasing the cumulative surface area of the dispersed bubbles without the need of removal from the fluid 234 via lock channels 244. The castellations 310 of flexible layer 206, disposed between the inner member 202 and outer member 204, are not angled, but rather stair-stepped. Each castellation 310 is preferably formed by one flexible barrier material 312 and one shim 322. By stair-stepping the castellations 310, the accumulation of multiple smaller gas bubbles 314 into a single large gas bubble within the LIVE unit 200 is mitigated. This is advantageous, as it is more difficult for a single large gas bubble to be reabsorbed into the fluid 234, than it is for multiple, smaller gas bubbles.

The LIVE unit 200 can be two concentric cylinders (the inner member 202 and the outer member 204) separated by a compliant material (flexible member 206) so that a steady force applied through the outer member 204 shears the compliant material 206 relative to the inner member 202 differentially changing the relative volumes in fluid chamber 228 and fluid chamber 230 and causing the fluid to displace through the LIVE tuning port 232. When the aircraft lifts upward into flight, the outer member 204 pulls upward relative to inner member 202, which raises the flexible member 206 from a slightly tapered condition (suitable for shedding bubbles while the aircraft is resting on the ground) into a flat, stair-stepped condition. This upward in-flight suspension creates a steady load on the LIVE unit 200. The flexible member 206 preferably includes a flexible barrier material 312 and a shim 322 and is disposed between the inner member and the outer member. Alternatively, the flexible member 206 can include a plurality of alternating flexible barrier material 312 and shims 322. Each step in the castellation 310 preferably includes one flexible barrier material 312 and one shim 322. By stair-stepping the castellations 310 during flight operations, rather than slopping the end portions, the peel stress in the elastomeric member 312 is reduced, thereby reducing the potential for the flexible member 206 to malfunction. Also, by stair-stepping the castellations 310 upward from the outer member 204, the bubbles are eventually shed upward if not yet re-absorbed.

Figure 2B:
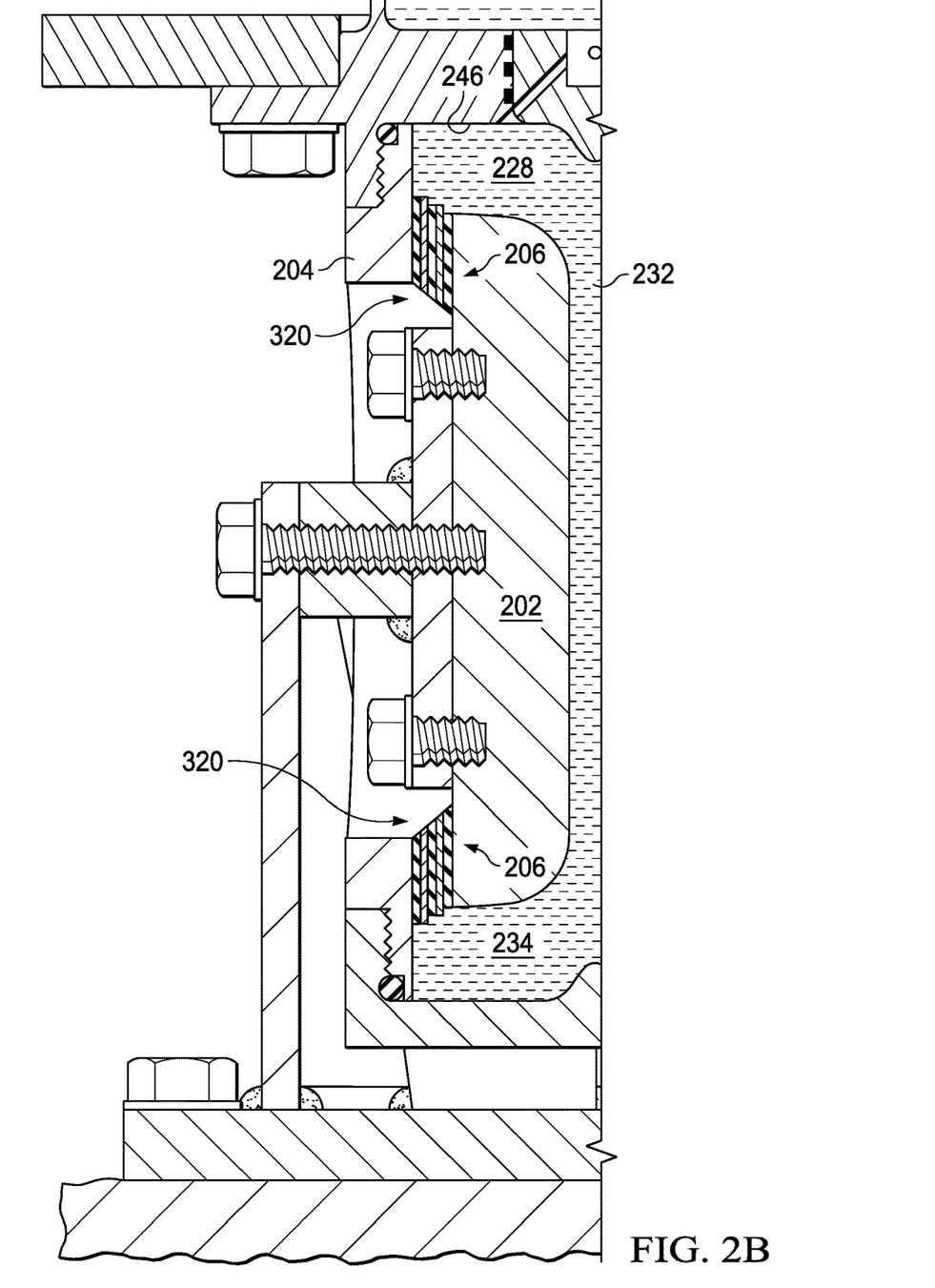
FIG. 2B is an enlarged view of the sloping surface adjacent to the mounting brackets of the LIVE unit in accordance with an embodiment of the present invention.

As shown in FIG. 2B, the LIVE unit 200 includes an flexible member 206 having an interior portion disposed within the assembly and an exterior portion 320 external to the assembly. The exterior portion 320 of the flexible member 206 may be sloped away from inner member 202 to prevent the trapping or ingress of water into the system between the two connected rigid members 202 and 204 of LIVE unit 200. Any water trapped between rigid members 202 and 204 can cause corrosion of the LIVE unit 200. By slopping the exterior portion 320 of the flexible member 206, any fluid will flow away from the inner member 202 and not be trapped or accumulated by the outer member 204 of the LIVE unit 200.

Figure 2C:
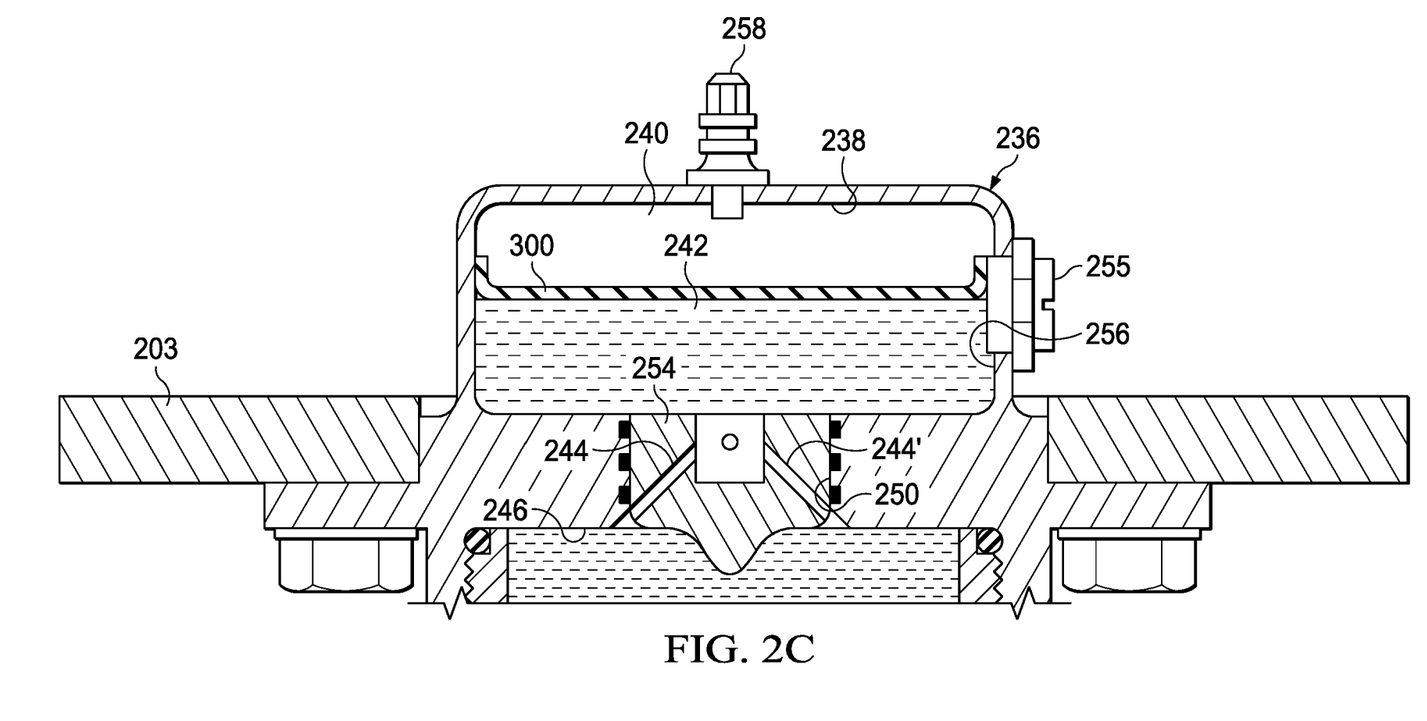
FIG. 2C is an enlarged view of the partition membrane between the fluid and gas chambers in accordance with an embodiment of the present invention.

As shown in FIG. 2C, a membrane 300 is disposed between the fluid-filled portion 242 and gas-filled portion 240 of partitioned compensator 236. The membrane 300, which may be permeable or impermeable, more closely maintains the partial vapor pressure of the dissolved gas within the fluid in chambers 228 and 230 and in tuned passage 232 to resting values, such that viscosity and fluidity of the fluid 234 is kept closer to optimum properties. The membrane can rise and fall between a maximum pressure mechanical stop and a minimum pressure mechanical stop, disposed within the partitioned compensator 236.

Additional embodiments include integrating the flexible member 206 into the castellated connection between inner member 202 and outer member 204, such that the outer member 204 directly engages the inner member 202 and having the flexible member 206 disposed therebetween.

Additional features include utilizing a swaged retaining ring, or split-ring connection to connect inner member 202 and outer member 204. Each of these features, including a castellated connection, swaged retaining ring, or split-ring connection, are advantageous over the axial threaded portion of the prior art due to ease of maintenance, assembly, disassembly, and adjustment for length of the passage (and therefore tuneability of the fluid passage 232).

Additional changes and or modifications of materials, dimensions, and methods may be used in accordance with the present invention, and within the skill of one of ordinary skill in the art.

What is claimed is:

1. A fluid vibration isolator assembly, comprising:
   an inner member;
   an outer member;
   a first operating chamber;
   a second operating chamber;
   a first fluid passageway connecting the first operating chamber and the second operating chamber, wherein an inertial fluid is disposed in the first operating chamber, the second operating chamber, and the fluid passageway;
   a volume compensator comprising a gas-filled portion and a fluid-filled portion, wherein the fluid in the fluid-filled portion of the volume compensator is connected to one of the first or second operating chamber by a second fluid passageway; and
   a flexible member disposed between the inner member and the outer member, wherein the flexible member includes a castellated terminal end, wherein the castellated terminal end comprises at least one stepped portion that is stepped at an angle normal to a longitudinal axis defined by the first fluid passageway.

2. The assembly of claim 1, further comprising a membrane separating the gas-filled portion and the fluid-filled portion of the volume compensator.

3. The assembly of claim 2, wherein the membrane is permeable to gas and impermeable to the fluid.

4. The assembly of claim 1, wherein the flexible member includes an interior portion disposed within the assembly and an exterior portion disposed external to the assembly.

5. The assembly of claim 1, wherein the inner member and the outer member are connected by a swaged locking ring connection.

6. The assembly of claim 1, wherein the inner member and the outer member are connected by a split-ring connector.

7. The assembly of claim 1, wherein the castellated terminal end includes a plurality of stepped portions at varying heights.

8. The assembly of claim 7, wherein the stepped portions reduce the volume of at least one of the first or second operating chambers from the operating chamber to the first fluid passageway.

9. The assembly of claim 7, wherein the flexible member closest to the volume compensator is sloped away from the volume compensator from the outer member to the inner member.

10. A fluid vibration isolator, comprising:
    an inner member;
    an outer member;
    a first operating chamber;
    a second operating chamber;
    a first fluid passageway connecting the first operating chamber and the second operating chamber, wherein an inertial fluid is disposed in the first operating chamber, the second operating chamber, and the fluid passageway; and
    a flexible member disposed between the inner member and the outer member, wherein the flexible member includes a castellated terminal end having at least two stepped portions that step upwardly from the outer member toward the inner member, wherein the at least two stepped portions are stepped at an angle normal to a longitudinal axis defined by the first fluid passageway.

11. The isolator of claim 10, further comprising a volume compensator comprising a gas-filled portion and a fluid-filled portion, wherein the fluid in the fluid-filled portion of the volume compensator is connected to one of the first or second operating chamber by a second fluid passageway.

12. The isolator of claim 11, further comprising a membrane separating the gas-filled portion and the fluid-filled portion of the volume compensator.

13. The isolator of claim 10, wherein the stepped portions are arranged at varying heights.

14. The isolator of claim 10, wherein the stepped portions reduce the volume of at least one of the first or second operating chamber from the first or second operating chamber to the first fluid passageway.

15. The isolator of claim 10, wherein the flexible member includes an interior portion disposed within the isolator and an exterior portion disposed external to the isolator, wherein the interior portion includes the castellated terminal end.

16. The isolator of claim 15, wherein the exterior portion of the flexible member is sloped away from the inner member such that any fluid will flow away from the inner member of the isolator.

17. The isolator of claim 15, wherein the stepped portions direct a gas bubble toward the first fluid passageway.

* * * * *